Aug. 28, 1962  R. C. CHATTIN  3,050,882
WHEEL SUPPORTED DITCHER
Filed Oct. 20, 1959  2 Sheets-Sheet 1
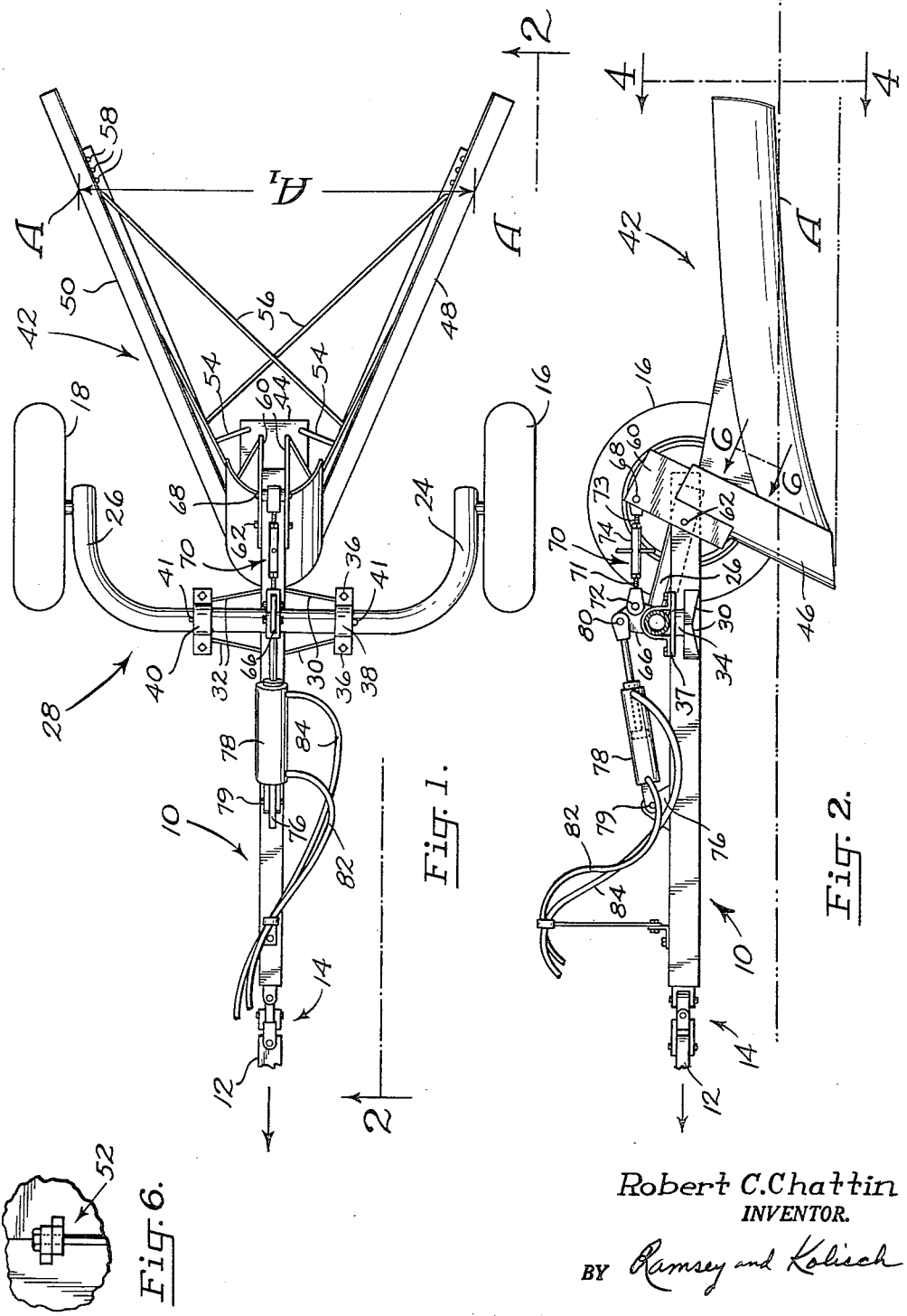
Robert C. Chattin
INVENTOR.
BY Ramsey and Kolisch
Attys.

Aug. 28, 1962 R. C. CHATTIN 3,050,882
WHEEL SUPPORTED DITCHER
Filed Oct. 20, 1959 2 Sheets-Sheet 2

Robert C. Chattin
INVENTOR.

BY Ramsey and Kolisch

Attys.

United States Patent Office 3,050,882
Patented Aug. 28, 1962

3,050,882
WHEEL SUPPORTED DITCHER
Robert C. Chattin, 2400 Bannock St., Boise, Idaho
Filed Oct. 20, 1959, Ser. No. 847,638
5 Claims. (Cl. 37—98)

This invention relates to ditcher apparatus, and more particularly to wheel supported ditcher apparatus having a wheel supported frame and a ditcher implement or tool carried by the frame adapted to be lowered into the ground and operable when so lowered to cut into the ground thus to dig a ditch.

The ditcher apparatus of this invention is ideally suited for forming irrigation or drainage ditches, and for clearing away weed growth and other matter from already formed ditches.

A particular feature of the ditcher apparatus of this invention is the provision of a structure wherein the lead angle of the ditcher implement relative to the wheel supported frame which carries the implement is automatically adjusted to the digging depth of the ditcher implement. Further, the position of moldboard portions in the ditcher implement relative to the wheel supported frame is also adjusted automatically with change in the digging depth. The result is a ditcher apparatus with which the ditcher tool or implement may be drawn through the ground with optimum suction angle and with optimum inclination of the moldboard portions for all depth settings of the tool.

Specifically, this invention contemplates ditcher apparatus having an implement portion made up of a pair of elongated moldboard sections or wing members for moving dirt, arranged in the form of a V with the moldboard sections diverging rearwardly from each other. Each moldboard section is set at an oblique angle relative to the width of cut. The moldboard sections have concavely curved outer faces which are operable to scoop up dirt and lay the dirt over to each side thereby to form elevated banks or shoulders along the sides of the ditch.

The ditcher apparatus also comprises a ditcher frame for carrying the moldboard sections upon a pair of laterally spaced support wheels. The support wheels are journaled upon the ends of an arched axle or wheel frame. This axle or wheel frame is pivotally mounted intermediate its ends on the main frame of the ditcher, and controlled pivotal movement of the axle raises or lowers the ditcher tool relative to the ground.

A feature of the invention is the inclusion of a pivot mounting for the ditcher tool connecting the tool to the main frame, and means linking the ditcher tool and the arched axle which carries the support wheels whereby automatically upon pivotal positioning of the arched axle relative to the main frame, adjustment also occurs in the relative position of the ditcher tool and the main frame. A power-actuated means or motor is provided to produce adjustment in rotation of the arched axle, and to set the arched axle at various degrees of rotation.

The foregoing briefly described construction has a number of advantages. In preparing an irrigation ditch, such as a border or a lateral ditch, the width of the ditch is as important a consideration as the depth of the ditch. An irrigation ditch, to be effective, must carry water at a higher level than ground level, as this enables water to flow from the ditch over the ground. The banks or shoulders along the sides of a ditch make this possible. As a consequence, when a shallow ditch is prepared, generally a wider ditch must also be produced, if enough dirt is to be obtained through digging to build shoulders of required height along the sides of the ditch. It follows that when a relatively shallow ditch is being made, the moldboards of the ditcher tool should be set in a position having a greater horizontal component. This enables substantially the entire cutting edges of the moldboards to be used in removing ground. With a deeper ditch, however, the moldboards may be inclined to greater degree from a horizontal position because enough dirt may be obtained for building the side shoulders. Thus, less of the cutting edges of the moldboards need to be used for ground cutting. The apparatus of this invention automatically takes care of such adjustment of the moldboards.

In a ditcher having a wheel supported frame which is adjusted to promote greater inclination to produce a deeper ditch, and thereafter adjusted to produce a shallower ditch, the "suction angle" of the ditcher implement would be subject to variation if the ditcher implement were to remain at all times at a fixed related angle to the frame. By this invention, a pivotal mounting for the ditcher implement is used, and the suction angle automatically is adjusted so as to remain nearly constant throughout all working positions of the ditcher tool frame.

Thus, it is an object of the invention to provide ditcher apparatus having a ditcher tool or implement for cutting into the earth wherein the suction angle of the ditcher tool is automatically adjusted with adjustment in the digging depth of the tool.

Another object is to provide ditcher apparatus wherein a change in the cutting width of the wing members or moldboard portions of the ditcher occurs conjointly with adjustment in the digging depth of the tool.

A more specific object of the invention is to provide ditcher apparatus having a main frame, an arched axle pivotally connected to the main frame, and an implement having moldboard sections pivotally connected to the main frame, with means linking the arched axle and implement portion wherein pivotal movement of the axle is accompanied by pivotal movement of the implement portion.

A further object is to provide such ditcher apparatus with power-actuated means for adjusting the position of the arched axle of the ditcher, such power-actuated means also performing the function of adjusting the position of the ditcher tool.

These and other objects and advantages are attained by the invention, which is described hereinbelow in conjunction with the accompanying drawings wherein:

FIG. 1 is a top plan view of ditcher apparatus constructed according to an embodiment of this invention, showing a pair of diverging moldboard sections or wing members and a wheel supported frame carrying the same;

FIG. 2 is a transverse section view of the apparatus shown in FIG. 1 along the line 2—2 in FIG. 1;

FIG. 6 is a section view along the line 6—6 in FIG. 2.

Figure 3:
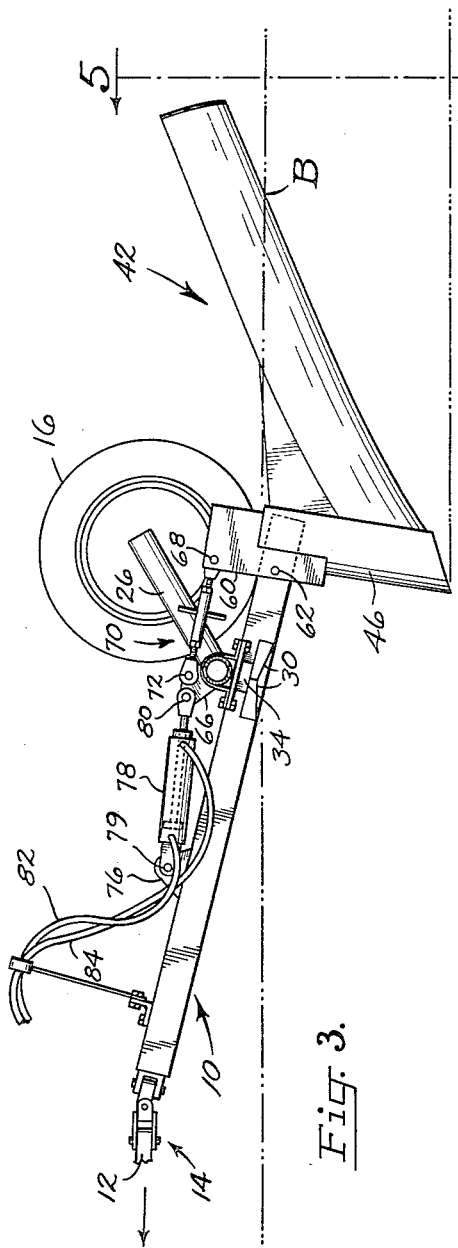
FIG. 3 is a view similar to FIG. 2, save that it shows the ditcher tool of the ditcher in a lowered position, such as it would occupy when digging a deeper ditch.

With reference now to the drawings, the ditcher apparatus illustrated comprises generally an elongated main frame 10 which is secured at its forward end to a conventional drawbar 12 of a tractor. Ordinarily the drawbar of a tractor rides at a relatively fixed elevation over the ground, and thus the left end of the main frame remains substantially at the same elevation regardless of the setting of the rear end of the frame. The connection between main frame 12 and the drawbar is by a conventional coupler mechanism 14.

Frame 10 is supported for transport over the ground at the rear end of a tractor by a pair of laterally spaced support wheels, indicated at 16 and 18, respectively. These are journaled on the ends, respectively of leg portions 24, 26 and an arched axle or wheel mounting frame, generally indicated at 28.

Axle or frame 28 is journaled intermediate its ends on main frame 10. Specifically, secured to the main frame and extending laterally outwardly to either side thereof are sets of plates 30, 32 which underlie and support a transversely extending support bar 34. The support bar and plates 30, 32 are secured to main frame 10 in any suitable manner, as by welding. Affixed to opposite ends of the support bar by nut and bolt assemblies 36 and plate segments 37 are a pair of bearing brackets 38 and 40. These brackets are journaled upon an intermediate portion of axle 28. Buttons 41 on the axle hold the axle from shifting laterally.

Pivotally connected at 62 to the rear end of main frame 10 is a ditcher tool or implement 42. The implement includes a subframe 44, a nosepiece 46 secured to frame 44 at the forward end of the tool in an oblique position when the tool is in digging position, and a pair of divergent wing members or moldboard sections 48, 50.

Each of the moldboard sections 48 or 50 has a concavely curved outer cutting face, which also operates to collect dirt dug away by the nosepiece and to roll the dirt over to one side of the ditch, thereby to build a shoulder or bank along this side. The forward, lower ends of the moldboard sections also perform some digging function. The nosepiece 46 is rigidly secured to subframe 44 and the moldboard sections are pivotally secured to the nosepiece by pivots 52 (see FIG. 6) arranged to accommodate swinging of the rear ends of the moldboard sections toward and away from each other.

Extending between the opposed moldboard sections are a pair of crossed bars 56. Extending from the subframe to the inside of the moldboard sections are bars 54. These several bars constitute means for fixing the wing members in a given angular position and with relation to the nosepiece. The rods have turned-over ends which fit within apertures such as apertures 58 provided in flanges which are arranged appropriately along the inner faces of the moldboard sections and the subframe. The rear ends of the moldboard sections may be swung together and fixed in a position closer than that shown in FIG. 1, by hooking the ends of rods 56 into apertures 58 spaced nearer the rear ends of the moldboard sections.

Secured in an appropriate manner to the subframe and extending vertically upwardly therefrom are a pair of mated mounting plates 60. The pivot connection between implement 42 and frame 10 is made by pivotally securing the mounting plates to the rear end of main frame 10 by pivot connection 62. Plates 60 are on both sides of the main frame, and thus aid in keeping the ditcher implement properly aligned with the main frame.

Mechanism for adjusting the relative positions of the axle with the ditcher implement is secured to arched axle 28 intermediate its ends and projects radially outwardly from the axle adjustment axis and includes an extension or crank arm 66. This crank arm is fixed to the axle, and rotates therewith.

Pivotally connected at 72 to crank arm 66 is one end of an extensible rod mechanism, generally designated at 70. The other end of the rod mechanism is pivotally connected at 68 to upstanding mounting plates 60. The extensible rod mechanism in the embodiment shown takes the form of a pair of stud elements 71, 73 which may be drawn together or pushed apart by a turnbuckle sleeve 74. While the overall length of mechanism 70 may be varied selectively, it does not vary during operation.

Interposed between frame 10 and arm 66 is a power-actuated expansible means. It is pivotally secured to an ear 76 on frame 10 by pivot 79, and preferably includes a fluid operated piston-cylinder 78. The piston rod for the piston-cylinder is pivotally connected to crank arm 66 by pivot connection 80. Conduits 82, 84 are intake and discharge conduits for the two ends of the piston-cylinder, and are connected to the usual control valve and fluid pressure source. Piston-cylinder 78 may be fully extended or fully contracted, or set at an intermediate degree of extension.

To explain the operation of the apparatus, FIGS. 2 and 3 illustrate two positions of adjustment of the apparatus. Thus FIG. 2 illustrates the ditcher implement and axle as they would be positioned for digging a relatively shallow ditch, and FIG. 3 illustrates the position of the ditcher implement and axle as they would appear during the digging of a deeper ditch.

To change from the relatively shallow ditch setting of FIG. 2 to the deeper ditch setting of FIG. 3, piston-cylinder 78 is contracted by retraction of the piston rod into the cylinder. This functions to swing crank arm 66 in a counterclockwise direction in FIGS. 2 and 3, with resulting movement of the wheels to the raised position relative to the main frame shown in FIG. 3. This lowers the rear end of main frame 10, and the ditcher implement carried by the rear end of frame 10. With swinging of crank arm 66, a tensioning of rod 70 takes place, and pivotal movement of the ditcher implement about its pivot occurs. When implement 42 is pivoted in this manner, the wings or moldboard sections of the tool are swung from the more horizontal position of FIG. 2 to the more inclined position of FIG. 3. At the same time, nosepiece 46 is moved to a more inclined vertical angle relative to frame 10.

Figure 4:
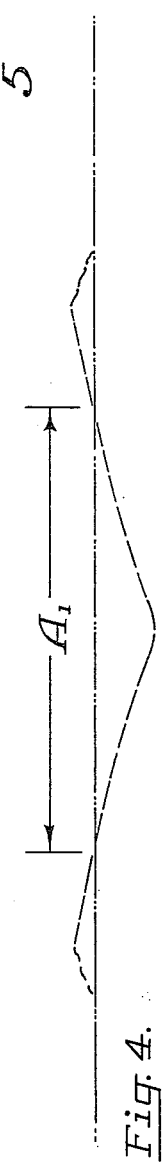
FIG. 4 illustrates a profile of a shallow ditch produced by the tool when it is set as in FIG. 2, viewing the ditcher profile along the line 4—4 in FIG. 2.

Adjustment in the angular position of the wheel portion of the implement permits the contour of the ditch and the depth thereof to be varied. When a shallow ditch is made, it is desirable that the ditch cover a relatively wide span, so that sufficient dirt is removed to build the side banks necessary to retain sufficient water to flow over the adjacent fields. With a deeper ditch, further substantial increase in ditch width is not needed, as the necessary dirt for side embankments is procured through the depth of cut. Thus, as can be noted in the drawings, and particularly those illustrating the ground level and profile, a shallow ditch and a deep ditch may be cut to have substantially equal widths. A typical shallow ditch setting is shown in FIGS. 1 and 2, and the contour of a ditch produced by the setting of FIGS. 1 and 2 is shown in FIG. 4. In FIG. 4, the width at ground level for a shallow ditch is illustrated as the dimension A1. In FIGS. 1 and 2, the points of intersection of the moldboards with ground level for the shallow ditch setting are designated at A. The distance between the two points A equals the dimension A1.

Figure 5:
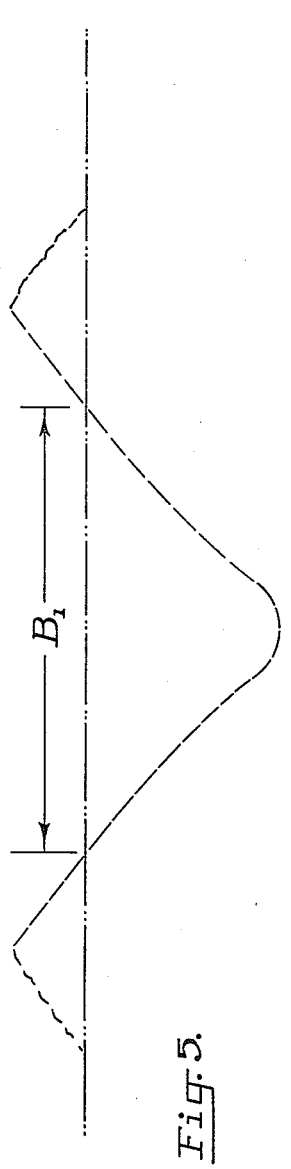
FIG. 5 illustrates the profile of a deeper ditch dug by the tool when as set in FIG. 3, viewing the profile along the line 5—5 in FIG. 3.

By varying the wheel positions of the ditcher, a ditch of deeper depth can be cut, and this ditch will have a width nearly like the width of the shallow ditch. Thus in FIG. 3, while the nosepiece is set at a lower level, the points of intersection of the moldboards with the ground level are substantially at the same location as when the shallow ditch is cut. In FIG. 3 such a point of intersection is designated at B. The width at ground level of moldboards set as in FIG. 3 is designated in FIG. 5 at B1 (which is equal to the distance between the lower edges of the moldboards at those points where they intersect the ground). It will be noted that the dimensions A1 and B1 are nearly the same.

The ditcher of this invention enables optimum setting of the moldboards and nosepiece, so that suitable amounts of dirt may be removed from the ground and thence displaced laterally to produce side embankments. For the shallower ditches, the wings have a relatively large horizontal component. With the deeper ditches, the horizontal component of the wings is decreased. The provision of a rounded nosepiece also provides additional dirt in contrast to a sharp-nosed or V-shaped nosepiece.

Another feature of the invention, it will be noted, is that the suction angle of the nosepiece is also adjusted with adjustment in ditcher implement depth. In FIG. 2, frame 10 approaches horizontal and the nosepiece of the ditcher element inclines slightly forwardly from its top to its base. When the ditcher implement is lowered to a deeper depth, frame 10 tilts down at its rear end. As a result, the suction angle of the ditcher tool would become insufficient, if the nosepiece remained in fixed position relative to frame 10. By comparing FIGS. 2 and 3, it will be seen that the nosepiece is automatically swung in a counterclockwise direction relative to the frame when the rear end of frame 10 is lowered.

The apparatus is readily placed in condition for transport with the implement portion riding above the ground. This is accomplished by full extension of the piston-cylinder, with the arched axle swinging in a clockwise direction in FIG. 2 until the wheels are fully lowered and the rear end of the frame 10 inclines upwardly. In this transport position, the nosepiece is shifted to a position more inclined from the vertical than that shown in FIG. 2. As a consequence, the base of the nosepiece is raised, and greater clearance is provided for the ditcher tool, which is also an important factor.

It is claimed and desired to secure by Letters Patent:

1. In ditcher apparatus having an elongated main frame, a ditcher implement adjacent the rear end of said main frame, and an axle extending transversely of said main frame positioned forwardly of said implement and with wheels journaled on the axle, the improvement comprising the combination of legs on said axle extending downwardly and toward the rear of said main frame with said wheels journaled on the ends of said legs, means pivotally mounting the axle and means pivotally mounting the implement for pivotal movement about substantially parallel axes extending transversely of said main frame, elongated wing members for said ditcher implement that laterally diverge and slope upwardly progressing rearwardly from the forward end of the implement, crank means joined to said axle intermediate its ends and projecting upwardly from the axle, extensible means pivotally connected at one end to said crank means and at its other end to said ditcher implement above the pivot axis for the implement and connecting the two whereby pivotal movement of the legs of the axle to the rear and upwardly relative to said main frame is accompanied by pivotal movement of the implement in the same direction with the rear ends of said wing members moving upwardly and the slope of the wing members increasing, and power-actuated means for pivoting said axle.

2. The apparatus of claim 1 wherein said ditcher implement further comprises a nosepiece carried at an acute angle relative to said wing members and disposed in front of the forward set of ends of said wing members.

3. The apparatus of claim 1 wherein the diverging wing members are mounted for pivotal movement relative to each other and wherein said implement further comprises means for fixing the wing members in various adjusted positions.

4. In ditcher apparatus having an elongated main frame, a ditcher implement adjacent the rear end of said main frame, and an axle extending transversely of said main frame positioned forwardly of said implement and with wheels journaled on the axle, the improvement comprising the combination of legs on said axle extending downwardly and toward the rear of said main frame with said wheels journaled on the ends of said legs, means pivotally mounting the axle and means pivotally mounting the implement for pivotal movement about substantially parallel axes extending transversely of said main frame, crank means joined to said axle intermediate its ends and projecting out from the axle, rod means connected to and interposed between said implement and said crank means and linking the two whereby pivotal movement of the legs of the axle to the rear and upwardly relatively to the main frame is accompanied by pivotal movement of the ditcher implement in the same direction with its suction angle decreasing, and power-actuated extensible means pivotally connected to and interposed between said main frame and said axle and operable upon actuation to cause pivotal movement of said axle and implement.

5. The apparatus of claim 4 wherein the rod means interposed between said implement and crank means is extensible.

References Cited in the file of this patent

UNITED STATES PATENTS

| | | |
|---|---|---|
| 2,228,865 | Bird | Jan. 14, 1941 |
| 2,235,670 | Chattin | Mar. 18, 1941 |
| 2,691,930 | Forgy | Oct. 19, 1954 |

OTHER REFERENCES

Operator's Manual OM-K45-157 for the John Deere Killefer, Ditcher No. 12, page 2 relied on. Published by John Deere and Co., Moline, Ill.